O. W. BOSTON & W. E. PATRICK, Jr.
HYDROSTATIC RELEASE MECHANISM.
APPLICATION FILED APR. 26, 1918.

1,294,327.

Patented Feb. 11, 1919.

INVENTORS.
ORLAN W. BOSTON
WILLIAM E. PATRICK, JR.
BY
ATTORNEY.

UNITED STATES PATENT OFFICE.

ORLAN W. BOSTON AND WILLIAM E. PATRICK, JR., OF WASHINGTON, DISTRICT OF COLUMBIA, ASSIGNORS TO THE GOVERNMENT OF THE UNITED STATES.

HYDROSTATIC RELEASE MECHANISM.

1,294,327. Specification of Letters Patent. Patented Feb. 11, 1919.

Application filed April 26, 1918. Serial No. 231,050.

*To all whom it may concern:*

Be it known that we, ORLAN W. BOSTON and WILLIAM E. PATRICK, Jr., citizens of the United States, residing at Washington, District of Columbia, have invented new and useful Improvements in Hydrostatic Release Mechanism, of which the following is a specification.

This invention relates to hydrostatic release mechanisms, and more particularly to that type adapted for use in connection with naval mining operations where it is desired to release a member after it has reached a predetermined submerged depth.

One of the objects of the present invention is to provide a simple and practical hydrostatic release mechanism which will be reliable and efficient in use and operation. A further object is to provide a device of the above general character, having relatively few parts which may be inexpensively manufactured and assembled.

Other objects will be in part obvious from the annexed drawings and in part indicated in connection therewith by the following analysis of this invention.

This invention accordingly consists in the features of construction, combination of parts and in the unique relations of the members and in the relative proportioning and dispositioning thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1:
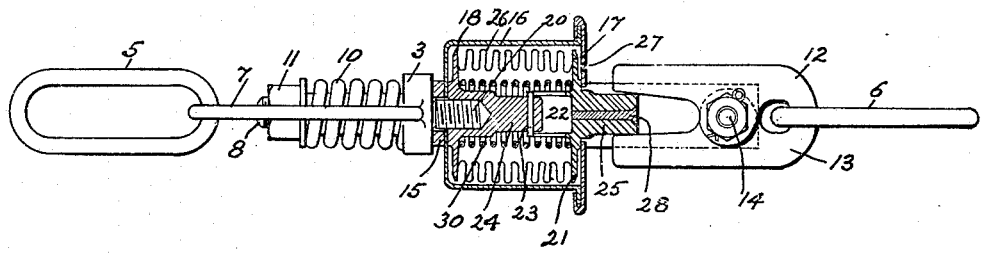
Figure 2:
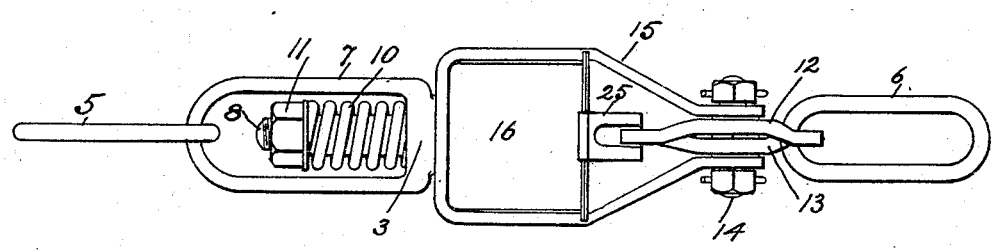

Figure 1 is an elevational view, partly in section, showing the complete device, and Fig. 2 is an elevational view taken at right angles to Fig. 1.

Referring now to the drawings in detail, it is sufficient to state that the two members desired to be disconnected by the release mechanism at a predetermined depth are designated by the characters 5 and 6. This release mechanism comprises a substantially U-shaped yoke 7, provided with a broad base member 3, its upper end having an opening through which a bolt is adapted to pass, and surrounding which is a coiled spring 10 operating between a nut 11 and the base 3 of the member 7 for taking up any shock that may occur to the system.

The member 6 is adapted to be engaged and held by a pair of jaws 12 and 13 pivotally mounted upon a bolt 14 supported in the ends by the U-shaped yoke member 15 surrounding the hydrostatically controlled release mechanism positioned within chamber 16, Fig. 2. This chamber, which is substantially cup-shaped, is provided with a cover member 17, and contains a head member 18 having a recessed portion 20 threadedly connected with the bolt 8. At the opposite end of the chamber is a second head member 21 provided with a cup-shaped interior wall 22 having a slot and pin connection 23 with boss 24 on the opposite head member 18. By means of this construction a relative telescopic movement may take place between the head members, and also any tension between head members 18 and 21 is taken up, thereby relieving the sylphon 26 of any strain. A substantially cylindrical outwardly projecting boss 25, integral with head member 21 extends through cover 17 and is provided with diametrically opposed flattened surfaces which fit between the rearwardly extending arms of the jaws 12 and 13, thereby to normally hold the same in closed position about the releasable member 6.

The two head members 18 and 21 are connected by a seamless metallic bellows or flexible diaphragm 26, known as a sylphon, and the cover member 17 is provided with one or more openings 27 to permit water to flow into the chamber or casing 16, thereby to compress the sylphon an amount proportional to the depth at which the release mechanism is submerged. It is, of course, to be understood that air under any desired pressure, either above or below or equal to atmospheric pressure, is trapped within the sylphon, and this may be accomplished during the process of assembling by means of an opening 28, which is subsequently sealed in any desired manner, as by solder, to maintain the required pressure. The air pressure within the sylphon, is preferably regulated according to previous tests of the elasticity or strength of the sylphon wall so that the sylphon will compress a predetermined amount for a certain depth, thereby to insure the inward movement of the boss 25 and consequent release of jaws 12 and 13. Where it is desired to have the release operate at depths greater than 15 or 20 feet, the air presure within the sylphon may be supplemented by a helically coiled spring 30 disposed between head members 18 and 21. For use at ordinary depths this spring is unnecessary and may be dispensed with, but for the sake of clearness we have included the spring in the device shown in Fig. 1.

The operation of the present device is substantially as follows: It is, of course, to be assumed that the parts are assembled substantially as shown in Fig. 1, with the sylphon adjusted to release at a depth of say 30 to 35 feet, as may be desired. As the mechanism submerges to this depth, water will pass through the openings 27 and cause a relative inward movement of the head 21, thereby gradually withdrawing the boss 25 from between the free ends of the jaws 12 and 13. Inasmuch as the member to be released, designated by the link 6, may be assumed to possess a certain positive buoyancy, sufficient pull will be exerted thereon at this submergence to release the link 6 as desired. Any shocks or sudden strains that may be exerted upon the apparatus from any cause will readily be taken up by the shock absorber spring 10 at the opposite end of the release mechanism.

It is thus seen that the present invention provides a reliable and efficient hydrostatic release mechanism particularly adapted for the use intended, which is of simple and practical construction and may be easily manufactured.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

We claim as our invention the following:—

1. In an apparatus of the character described, in combination, a chamber having an opening, hydrostatically compressible means within said chamber, securing means disposed at one side of the chamber adapted to be released on the compression of said first means, a support for said securing means surrounding said chamber, and a shock absorbing and attaching means connected with said chamber at the opposite side.

2. In an apparatus of the character described, in combination, a chamber having an opening, hydrostatically compressible means within said chamber, jaws adapted to be released on the compression of said means, a support for said jaws surrounding said chamber, and a shock absorbing and attaching means connected with said chamber at the opposite side.

3. In an apparatus of the character described, in combination, a chamber having an opening, hydrostatically compressible means within said chamber, a pair of pivotally mounted jaws without said chamber, and means connected with said compressible means normally holding said jaws in closed position and adapted to release said jaws when said hydrostatic means is compressed 4. In an apparatus of the character described, in combination, a chamber open to hydrostatic pressure, a sylphon device within said chamber, permanent attaching means at one side of said chamber, releasable attaching means at the opposite side of said chamber controlled by said device within said chamber, and shock absorbing means associated with one of said parts.

5. In an apparatus of the character described, in combination, a chamber open to hydrostatic pressure, pressure actuated means within said chamber, permanent attaching means at one side of said chamber, releasable attaching means at the opposite side of said chamber controlled by said means within said chamber, and shock absorbing means associated with one of said parts.

6. In an apparatus of the character described, in combination, a chamber open to hydrostatic pressure, a sylphon within said chamber, attaching means at one side of said chamber, releasable attaching means at the opposite side of said chamber, said last named means comprising a pair of pivoted jaws, and a boss carried by said sylphon normally interposed between the free ends of said jaws adapted to hold the opposite ends in closed position.

7. In an apparatus of the character described, in combination, a chamber open to hydrostatic pressure, a sylphon within the chamber, said sylphon including means whereby its compressibility may be regulated, attaching means at one side of said chamber, releasable attaching means at the opposite side of said chamber, comprising a pair of pivoted jaws and a boss carried by said sylphon normally interposed between the free ends of said jaws adapted to hold the opposite ends in closed position.

8. In an apparatus of the character described, in combination, a chamber open to hydrostatic pressure, relatively telescopically movable head members within said chamber, pressure actuated means connecting said head members, attaching means associated with said chamber at one side, releasable attaching means associated with the opposite side of said chamber, and intervening means between the releasable attaching means and the pressure actuated means adapted to hold said attaching means in closed position until said pressure actuated means is compressed.

9. In an apparatus of the character described, in combination, a chamber open to hydrostatic pressure, a pair of relatively movable head members within said chamber, a collapsible sylphon connecting said head members, attaching and shock absorbing means connected with one of said head members, a strap surrounding said chamber and extending to one end thereof, a pair of jaws pivotally mounted between the free ends of said strap member constituting a releasable attaching device, and a boss carried by one of said head members normally lying between the free ends of said jaws and adapted to hold the same in closed position until said sylphon is compressed.

Signed at Washington, District of Columbia, this 20th day of April, 1918.

ORLAN W. BOSTON.
WILLIAM E. PATRICK, Jr.

Copies of this patent may be obtained for five cents each, by addressing the "Commissioner of Patents, Washington, D. C."